(12) United States Patent
Sakanoue et al.

(10) Patent No.: US 6,539,241 B1
(45) Date of Patent: Mar. 25, 2003

(54) PAGING AMPLIFIER FOR CELLULAR PHONE

(75) Inventors: Hisafumi Sakanoue, Osaka (JP); Masaki Motohashi, Osaka (JP)

(73) Assignee: Noboru Electric Co., Ltd., Osaka (JP)

( * ) Notice: Subject to any disclaimer, the term of this patent is extended or adjusted under 35 U.S.C. 154(b) by 0 days.

(21) Appl. No.: 09/492,131

(22) Filed: Jan. 27, 2000

(30) Foreign Application Priority Data

Feb. 25, 1999 (JP) ............................................ 11-096763

(51) Int. Cl.$^7$ ................................................. H04Q 7/20
(52) U.S. Cl. ..................... 455/567; 455/550; 455/568
(58) Field of Search ........................ 455/90, 74.1, 426, 455/462, 550, 567, 568, 569, 575; 579/426, 428.01, 428.02, 435, 436, 446

(56) References Cited

U.S. PATENT DOCUMENTS

| | | | | |
|---|---|---|---|---|
| 5,253,292 A | * | 10/1993 | Fluder et al. ................ | 379/426 |
| 5,471,530 A | * | 11/1995 | Chen .......................... | 379/446 |
| 5,758,289 A | * | 5/1998 | Lipp et al. ................... | 455/462 |
| 5,794,163 A | * | 8/1998 | Paterson et al. ............. | 455/568 |
| 5,864,619 A | * | 1/1999 | Ehara ......................... | 379/435 |
| 5,884,191 A | * | 3/1999 | Karpus et al. ............... | 455/557 |
| 6,108,531 A | * | 8/2000 | Berg et al. ................... | 455/569 |
| 6,201,951 B1 | * | 3/2001 | Duwaer et al. ............. | 455/74.1 |
| 6,397,087 B1 | * | 5/2002 | Kim et al. ................... | 455/569 |

FOREIGN PATENT DOCUMENTS

| | | |
|---|---|---|
| JP | 5-83183 | 4/1993 |
| JP | 11341143 | 12/1999 |

OTHER PUBLICATIONS

English language abstract of JP 5–83183.
"Amplification Adapter for Cellular Phone", Noboru Electric, Osaka, Japan, Jan. 13, 1999.

* cited by examiner

*Primary Examiner*—Nay Maung
(74) *Attorney, Agent, or Firm*—Greenblum & Bernstein, P.L.C.

(57) ABSTRACT

The present invention provides a paging amplifier for a cellular phone, which includes an input/output terminal connected to an earphone microphone terminal of the cellular phone. An output terminal of the paging amplifier is connected to an external speaker. The paging amplifier includes a handset that has a microphone and a speaker, and a detector that detects whether the handset is in a predetermined position. A calling sound of the cellular phone is input to the paging amplifier through the earphone microphone terminal and the input/output terminal. The paging amplifier amplifies the input calling sound and outputs the amplified calling sound to the external speaker through the output terminal. The external speaker receives and broadcasts the amplified calling sound. When the handset is removed from the predetermined position, the detector detects the action and stops the calling sound. Since the paging amplifier for the cellular phone amplifies the calling sound of the cellular phone and outputs the amplified sound through the external speaker, the user does not miss hearing the calling sound. Further, since the calling sound stops when the handset is operated (removed from the predetermined position), usage of the paging amplifier is very convenient.

14 Claims, 12 Drawing Sheets

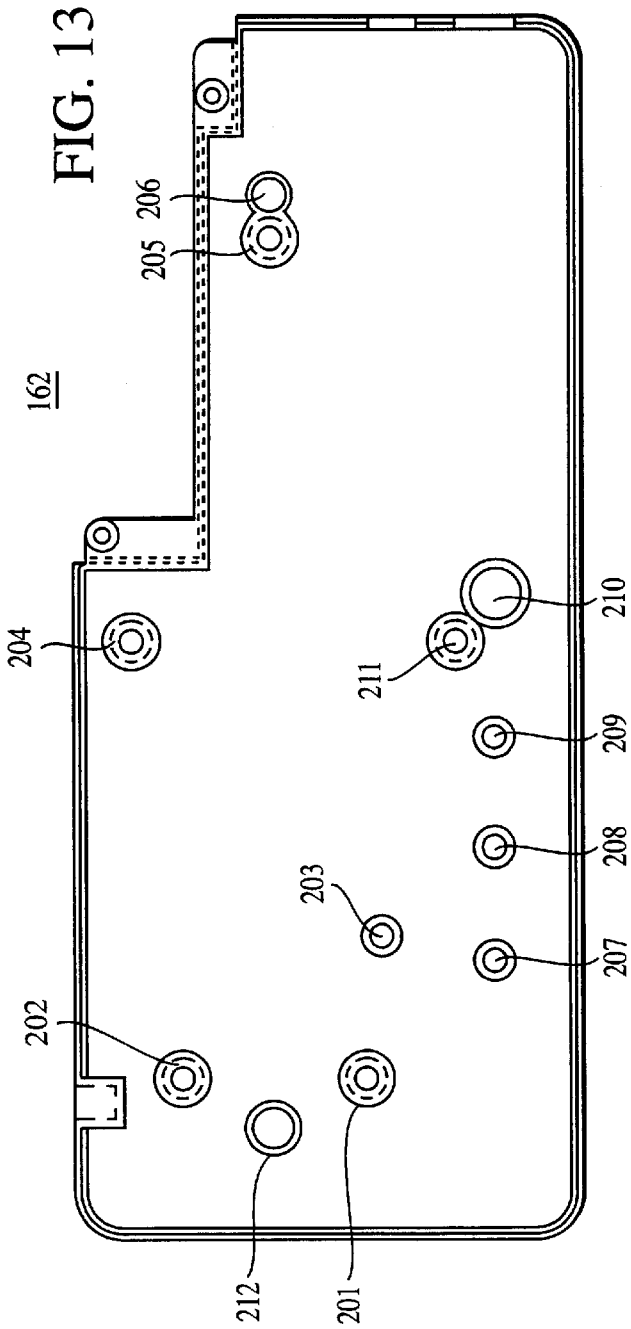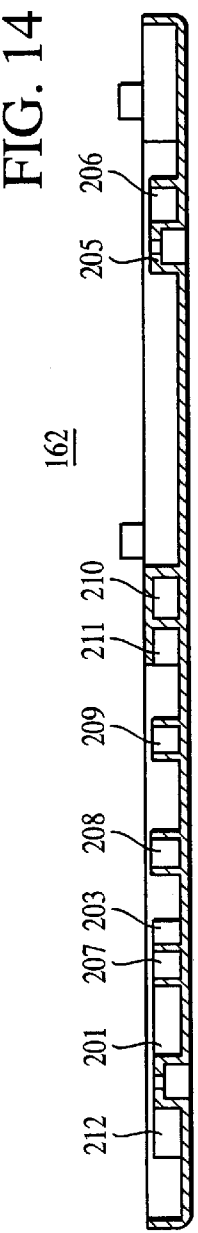

PAGING AMPLIFIER FOR CELLULAR PHONE

BACKGROUND OF THE INVENTION

1. Field of Invention

This invention relates to a paging amplifier for a cellular phone that amplifies a calling sound. This invention further relates to a paging amplifier for a cellular phone that enables speaking over the cellular phone through a handset. Furthermore, this invention relates to a paging amplifier for a cellular phone that enables a paging broadcast by using a handset. In addition, this invention relates to a configuration of a connection between a cellular phone and a paging amplifier for the cellular phone. Further, this invention relates to a paging amplifier for a cellular phone that enables a handset to be firmly attached to a handset mounting position.

2. Description of Related Art

A cellular phone is very convenient, since a user can carry the cellular phone and can use it immediately after receiving a call. However, sometimes the user cannot carry the cellular phone and leaves it on board a ship, since, for example, water may splash on the cellular phone or the cellular phone can be an obstacle to activities that the user wishes to undertake. Under such conditions, the user sometimes cannot hear a calling sound (ring tone), because the calling sound of the cellular phone is too low or the surroundings are too noisy.

To overcome this inconvenience, the inventors of the present invention are manufacturing and selling a Call Speaker (trade name) for a cellular phone as shown in FIG. 6, which is provided with a microphone 52 installed adjacent to a speaker 51 of a cellular phone 50, and which amplifies an output of the microphone 52 by use of an amplifier 54, and outputs the amplified output (sound) through an external speaker 55. The inventors of the present invention are also manufacturing and selling a Call Speaker (trade name) for a cellular phone as shown in FIG. 7, which is provided with a plug 57 insertable into a jack 56 of the earphone microphone of the cellular phone 50, and which amplifies an output of the plug 57 by use of the amplifier 54, and outputs the amplified output (sound) through the external speaker 55. Thus, since the Call Speaker amplifies and broadcasts the calling sound of the cellular phone, the user does not miss the calling sound.

As described above, the user will not miss the calling sound any more, since the Call Speaker amplifies and broadcasts the calling sound of the cellular phone. However, after hearing the calling sound, the user cannot use the cellular phone unless the user goes to the location of the cellular phone, removes the microphone or the plug from the cellular phone and operates a receiving button of the cellular phone. Thus, since there are many operation steps necessary to make the cellular phone operational, the user may take a long time to begin speaking, or sometimes cannot even speak, in a worst case.

There are two types of cellular phones: those that have a three-port earphone microphone terminal and those that have a four-port earphone microphone terminal. Accordingly, when a paging amplifier for a cellular phone is connected to an earphone microphone terminal of a cellular phone, two types of paging amplifiers, which have three and four terminals, should be provided according to the type of the cellular phones.

There is a wall hanging type telephone, an indoor intercom device, and an automobile telephone, which are similar to the paging amplifier having the handset for a cellular phone. In these devices, the main body of the device is hung on a wall, and a handset has a narrow part (or neck) on a speaker side to be hung in the main body. The main body of the automobile telephone has a recess to engage a handset therein. The above-described hanging mechanism and engaging mechanism of the handset satisfies basic requirements for the paging amplifier for the cellular phone to be hung on a wall or pillar (i.e., vertical post), is secure against vibration, pitching and rolling. However, by these mechanisms, the paging amplifier cannot be attached on a ceiling or to an inclined overhang. In addition, there is insufficient reliability to remain secure in the presence of large vibrations or pitching. If the strength of hanging or engagement is made bigger to increase the reliability that the handset remains secured, it becomes difficult to pick up the handset and it becomes inconvenient to use it.

This invention is made to provide a paging amplifier for a cellular phone, which has a handset support member so as to permit attaching the paging amplifier on a ceiling and on inclined overhang, as well as on a wall and a pillar, to increase the reliability of engagement against large vibration and pitching, and yet still be easy to pick up.

SUMMARY OF THE INVENTION

To achieve the above and other goals, the present invention provides a paging amplifier for a cellular phone, which includes an input/output terminal connected to an earphone microphone terminal of the cellular phone. An output terminal of the paging amplifier is connected to an external speaker. The paging amplifier includes a handset that has a microphone and a speaker, and a detector that detects whether the handset is in a predetermined position. A calling sound of the cellular phone is input to the paging amplifier through the earphone microphone terminal and the input/output terminal. The paging amplifier amplifies the input calling sound and outputs the amplified calling sound to the external speaker through the output terminal. The external speaker receives and broadcasts the amplified calling sound. When the handset is removed from the predetermined position, the detector detects the action and stops the calling sound. According to the present invention the predetermined position of the handset is not limited to a hook on which the handset is hung. For example, it is possible to provide a sensor that detects when the handset is laid on a predetermined position.

According to the present invention, since the paging amplifier for the cellular phone amplifies the calling sound of the cellular phone and outputs the amplified sound through the external speaker, the user does not miss hearing the calling sound. Further, since the calling sound stops when the handset is operated (removed from the predetermined position), it is very convenient. It is preferable to automatically enable the user to speak over the telephone through the handset after the calling sound is stopped in response to the removal of the handset from the predetermined position. Further, it is preferable that the sound volume of the calling sound is adjustable by using a sound adjusting switch or volume controller that is provided preceding the sound amplifier.

The present invention further provides a paging amplifier for a cellular phone, which includes a handset having a microphone and speaker, and an input/output terminal connectable to an earphone microphone terminal of the cellular phone. A voice sound input from the microphone of the handset is supplied to the cellular phone via the input/output terminal of the paging amplifier. A voice sound signal output from the cellular phone is supplied to the handset via the input/output terminal of the paging amplifier and is output from the speaker of the handset.

According to the present invention, since the cellular phone and the paging amplifier for the cellular phone are connected with each other, the user can speak over a telephone by using the handset. After the calling sound is stopped by the above-described operation (removal of the handset from the predetermined position), the user can immediately start speaking over the telephone without any additional operation. Thus, the user can use the cellular phone very conveniently. The sound volume of the handset can be adjusted by using a volume controller provided on the cellular phone.

In accordance with another aspect of the present invention, there is provided a paging amplifier for a cellular phone, which includes an on/off switch which is actuated when a handset is removed from a predetermined position, in a circuit that connects an earphone microphone terminal of the cellular phone and an external speaker. In addition, a switch that is interlocked with the on/off switch is connected to a control terminal of the cellular phone so that a connection (i.e., line of contact) is connected and disconnected.

Thus, when the handset is operated, the paging amplifier automatically enables the user to start speaking over a telephone after stopping the calling sound. Thus, the usage of the paging amplifier becomes convenient.

The present invention can be used with any form and type of handset, for example, a so-called handset of a telephone, which has an integral microphone and a speaker spaced with each other, a headset having a microphone and a speaker, and a combination of an independent microphone and a speaker mounted on a body of the paging amplifier. When the microphone and the speaker are provided separately, the detector detects one of the positions of the microphone and the speaker.

In another aspect of the present invention, there is provided a paging amplifier for a cellular phone, in which a plug provided on the paging amplifier is inserted into an earphone microphone jack of the cellular phone. Thus, an earphone terminal of the cellular phone is connected to an external speaker and a speaker of a handset via the plug of the paging amplifier. In addition, a microphone terminal of the cellular phone is connected to a microphone of the handset via the plug.

Since the cellular phone is connected to the paging amplifier for the cellular phone by inserting the plug of the paging amplifier into the earphone microphone jack of the cellular phone, the connection therebetween is provided inexpensively and easily. Further, the paging amplifier of the present invention can be used without any modification of the cellular phone.

In further aspect of the present invention, there is provided a paging amplifier for a cellular phone, in which a broadcast switch is provided between a microphone terminal of the paging amplifier and a microphone of a handset. When the broadcast switch is set to be in an OFF state, a microphone terminal of the cellular phone is connected to the microphone of the handset via the microphone terminal of the paging amplifier. When the broadcast switch is set to be in an ON state, the microphone of the handset is connected to the external speaker through an amplifier.

Accordingly, by merely providing the broadcast switch, broadcasting can be performed in calling or out of calling over a telephone.

In another aspect of the present invention, there is provided a paging amplifier for first and second cellular phones that includes a single circuit board of the paging amplifier that can be used with both the first cellular phone and the second cellular phone. A first earphone plug is provided for the first cellular phone and a second earphone plug is provided for the second cellular phone. The first and second cellular phones are connected to the single circuit board of the paging amplifier by using the first and second earphone plugs, respectively.

Thus, since two types of earphone plugs are provided for two types of cellular phones, each type of cellular phone can be connected to a single paging amplifier by using one of the two types of earphone plugs. Accordingly, common parts are increased and expenses are decreased.

Another aspect of the present invention provides a paging amplifier, in which a first cellular phone has a four-port earphone microphone jack, and a second cellular phone has a three-port earphone microphone jack. The first earphone plug includes a four-port plug that is inserted into the four-port microphone jack of the first cellular phone. The second earphone plug includes a three-port plug that is inserted into the three-port microphone jack of the first cellular phone.

Thus, the paging amplifier can be efficiently used with an existing cellular phone having a four-port earphone microphone jack and another existing cellular phone having a three-port earphone microphone jack.

Another aspect of the present invention provides a paging amplifier, in which a first terminal of the four-port plug is connected to a microphone terminal of the paging amplifier, a second terminal of the four-port plug is connected to an earphone terminal of the paging amplifier, a third terminal of the four-port plug is connected to a ground terminal of the paging amplifier and a fourth terminal of the four-port plug is connected to a control terminal of the paging amplifier. Further, a first terminal of the three-port plug is connected to a microphone terminal of the paging amplifier, a second terminal of the three-port plug is connected to an earphone terminal of the paging amplifier, and a third terminal of the three-port plug is connected to a ground terminal of the paging amplifier. In addition, the three-port plug has a jumper line that shorts control terminals of the paging amplifier.

Accordingly, the paging amplifier can be used with the two types of cellular phones and are connected with each other with a small number of wires by using the four-port earphone plug and the three-port earphone plug.

In another aspect of the present invention, there is provided a paging amplifier for a cellular phone, which includes a handset support member. The paging amplifier includes a body and a handset. The body has a handset mounting portion. A handset hooking portion is provided at one end of the handset mounting portion. The handset support member is provided at another end of the handset mounting portion. The handset is fixed to the body by the handset hooking portion and the handset support member.

Accordingly, since the handset is pressed by the handset hooking portion at one end and is pressed by the handset pressing portion at another end, the handset is firmly fixed to the body. Therefore, even if the paging amplifier for a cellular phone is hung on a ceiling or an inclined overhang as well as on a wall and a pillar, the body stably and securely holds the handset. Further, the handset will remain securely positioned even in the presence of large vibrations or pitching and rolling, and the handset can be easily engaged with and disengaged from the body.

Another aspect of the present invention provides a paging amplifier for a cellular phone, in which the handset hooking portion is provided on a handset connection cord side, and is formed as a protrusion provided on an upper case, which includes the handset mounting portion.

Accordingly, since the handset hooking portion is integrally formed with the upper case, which has the handset mounting portion, the strength of the handset hooking portion increases. Further, the hooking portion can be integrally formed by a resin molding. Thus, manufacturing of the hooking portion is simplified. In addition, since the handset hooking portion is provided at the handset connection cord side, the handset connection cord is located at hand side. Therefore, the handset is engaged with or disengaged from the body at the handset connection cord side. Thus, the handset connection cord does not become an obstacle to the hanging and pick-up operation of the handset.

In another aspect of the present invention, there is provided a paging amplifier for a cellular phone, in which the handset hooking portion has an overhang portion that holds a part of the handset.

Accordingly, a tip side of the handset (speaker side of the handset) can be easily rotated around the handset hooking portion. Thus, the handset can be inserted into and released from the handset support member. In addition, the overhang portion prevents the handset from dropping.

In another aspect of the present invention, there is provided a paging amplifier for a cellular phone, which has a handset support member including a shaft portion provided under the handset mounting portion and a pressing portion provided at the upper side of (i.e., above) the handset, and an arm portion which connects the shaft portion and the pressing portion. The pressing portion moves between an upper pressing position and a release position of the handset according to the rotation of the arm portion around the shaft portion.

Since the handset support member moves between the pressing position and the release position by rotation around the shaft portion, the handset support member firmly holds the handset. Accordingly, reliable engagement even in the presence of large vibrations, pitching and rolling is provided. Further, the engagement and disengagement of the handset become easier. The pressing portion, the arm portion and the shaft portion can be integrally formed by bending a rod made of e.g. a steel or a stainless steel. Thus, the manufacturing of the handset support member becomes simpler.

In another aspect of the present invention, the shaft portion extends from one end of the arm portion. The main body of the paging amplifier includes an upper case and a lower case, and the shaft portion is sandwiched between the upper case and the lower case. Thus, the structure is simple and assembly is easy. Further, since no special bearing member is required, the cost is reduced.

According to yet another aspect of the present invention, there is provided a paging amplifier for a cellular phone, which has the handset support member in which the shaft portion is bent at a right angle and extends to form a stopper portion that restricts a rotation angle of the arm portion.

According to the feature of the present invention, the stopper portion is also integrally formed with the pressing portion, the arm portion and a fulcrum (the shaft) of the handset support member by bending a rod made of e.g. a steel or a stainless steel. Thus, the manufacturing of the handset support member becomes simpler and assembly becomes easier. Further, the strength of the handset support member is increased.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 13 is a cross-sectional view of the upper case of the paging amplifier for a cellular phone according to the embodiment of the present invention.

FIG. 14 is a bottom view of the upper case of the paging amplifier for a cellular phone according to the embodiment of the present invention.

DETAILED DESCRIPTION OF PREFERRED EMBODIMENTS

Figure 1:
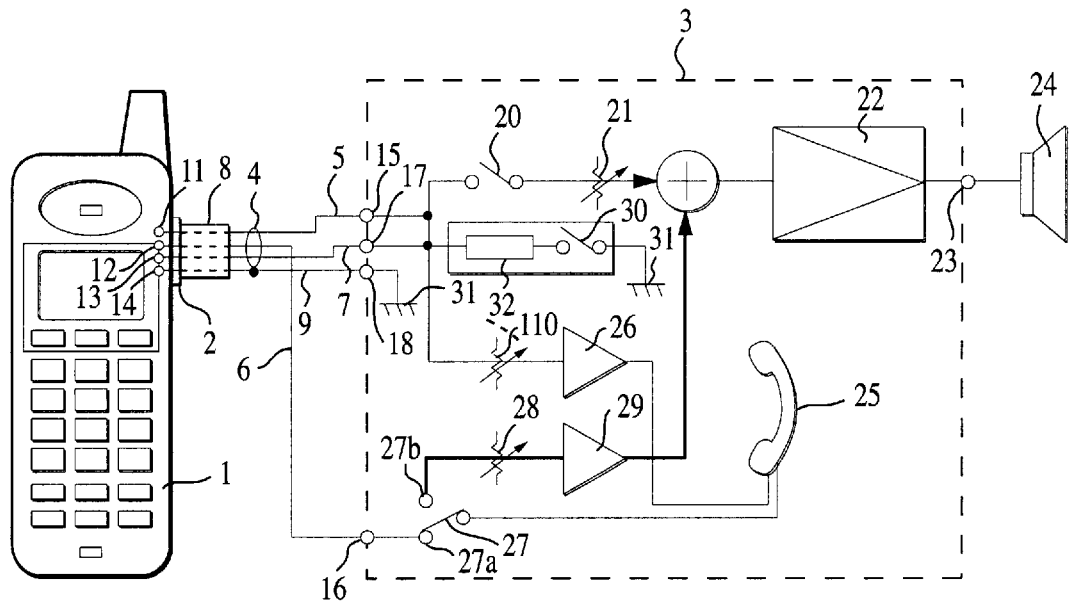
FIG. 1 is a circuit diagram of a paging amplifier for a cellular phone according to a first embodiment of the present invention.

A paging amplifier for a cellular phone according to the present invention is connected to an earphone microphone terminal of the cellular phone. The paging amplifier amplifies a calling sound by using a handset provided on the paging amplifier for the cellular phone and an external speaker connected to the handset. The paging amplifier further enables a call to be conducted through the handset and broadcast from the handset. In addition, the present invention provides an easy and inexpensive connection between a cellular phone and a paging amplifier for the cellular phone.

FIGS. 8 through 12 show a top view, a front-elevation view, left side view, right side view and bottom view of the paging amplifier 160 for a cellular phone according to the embodiment of the present invention. As shown in these figures, the paging amplifier 160 includes an upper case 161, a lower case 162, a printed circuit board 163, a handset 164 and a handset support member 165.

The upper case 161 has a handset mounting portion 168, which includes a recess (first recess) 166 on the free end or tip side (speaker side) of the handset, and a recess (second recess) 167 on the hand side (microphone side) of the handset. The upper case 161 is formed of a resin molding. The first recess 166 is relatively shallow and is surrounded by a raised portion (first raised portion) 169 at the front end and both sides. About the half of the thickness of the handset is accommodated by the first raised portion 169. The second recess (hooking portion) 167 is surrounded by a raised portion (second raised portion) 171 at the rear end and both sides. The second raised portion 167 has an overhang portion 170 on the tip, which holds a part of the hand side (microphone side) of the handset. The microphone side of the handset has a handset connection portion 172. A connection cord 173 is inserted into the connection portion 172; thus, the handset is connected to a main body of the paging amplifier of the cellular phone. A notch 174 is provided in the center portion of the second raised portion 171 to avoid the connection line 173 becoming an obstacle to the engagement and disengagement of the handset 164.

Screw holes 175 and 176 (FIG. 8), which are used to mount the paging amplifier on a wall, a pillar or post, a ceiling, and so on, are provided in the first recess 166 and the second recess 167, respectively. As shown in the cross-sectional view of the upper case of FIG. 15, the screw holes 175 and 176 are formed as bosses 177 and 178, which are formed during the resin molding of the upper case 161 and extend to terminate at the outer surface of the lower case 162.

The paging amplifier of the present invention has a hook switch 179 (FIG. 8) in the speaker side and a printed circuit board 163 for a telephone line control. The hook switch 179 is set to be in the ON state when the handset 164 is positioned on the handset mounting portion 168, and is set to be in the OFF state when the handset 164 is removed from the handset mounting portion 168.

A calling sound volume controller 180, an earphone sound volume controller 181, a broadcast volume controller 182, and a broadcast switch 183 are aligned at the left side of the main body to control the operation of the paging amplifier. The broadcast switch 183 switches between an amplifier for paging and an amplifier for broadcast. In addition, a power lamp 184 is also aligned with the volume controllers 180–182 and the switch 183.

Figure 12:
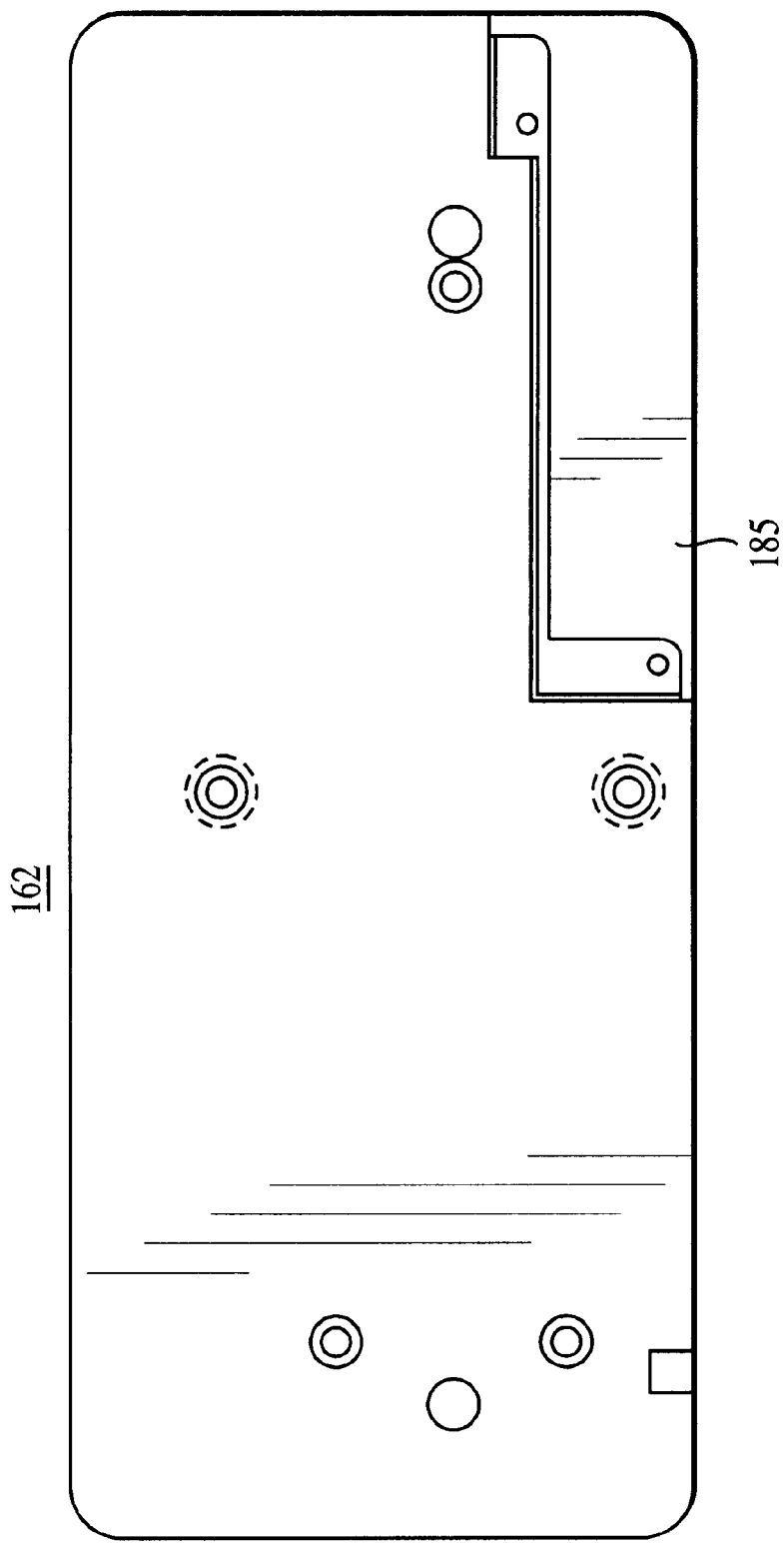
FIG. 12 is a bottom view of the paging amplifier for a cellular phone according to the embodiment of the present invention.

As shown in FIG. 12, the lower case 162 has a lid 185 of a cord case at a part of the connection cord side. The lid 185 of the cord case covers a pocket 186 (shown in FIG. 16) of the cord case provided in the inner side of the upper case 161. The lid 185 forms an opening to permit a power cord, a speaker cord and an input cord 187 to pass therethrough, and provides a space to house a part of the power cord, the speaker cord and the input cord 187. The power cord, the speaker cord and the input cord 187 pass through the pocket opening to connect to the main body of the paging amplifier.

Figure 11:
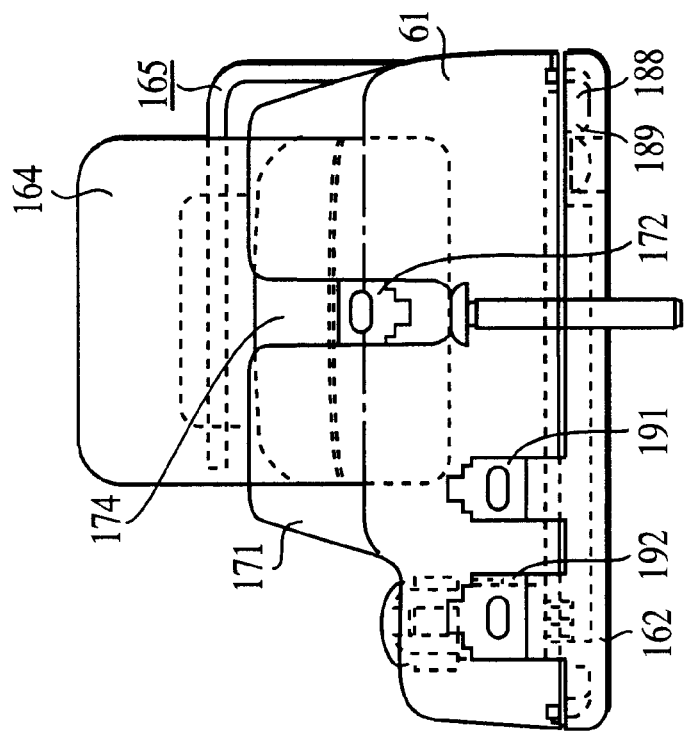
FIG. 11 is a right side view of the paging amplifier for a cellular phone according to the embodiment of the present invention.

As shown in FIG. 11, a 4P modular jack type connection portion 191 for a handset and a 6P modular jack type connection portion 192 for a cellular phone are provided on the connection cord side (microphone side) of the upper case 161. Since the upper case 161 has a stepped top portion of the modular jacks and the lower case 162 has a bottom portion of the modular jack, the connection portions 191 and 192 are formed when the upper case 161 and the lower case 162 are matingly combined (assembled). A modular jack for the connection cord 173 to connect the handset 164 to the body is inserted into the connection portion 191. A modular jack to connect a cellular phone is inserted into the connection portion 192.

Figure 15:
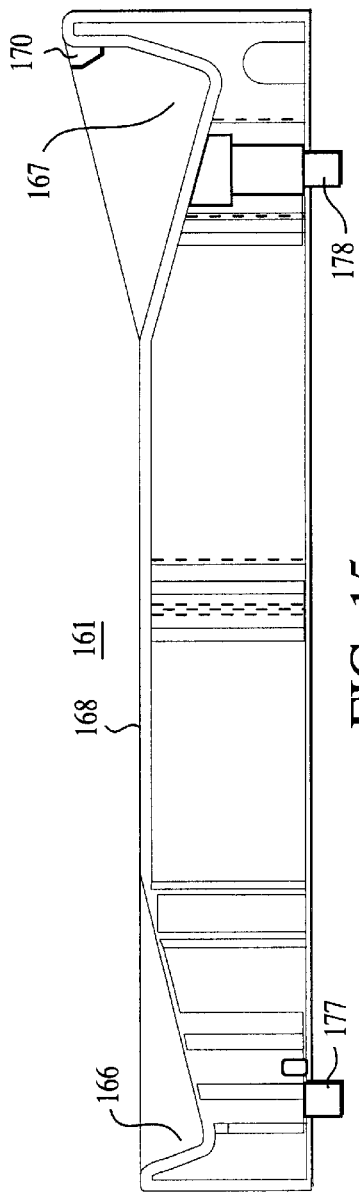
FIG. 15 is a top view of the lower case of the paging amplifier for a cellular phone according to the embodiment of the present invention.
Figure 16:
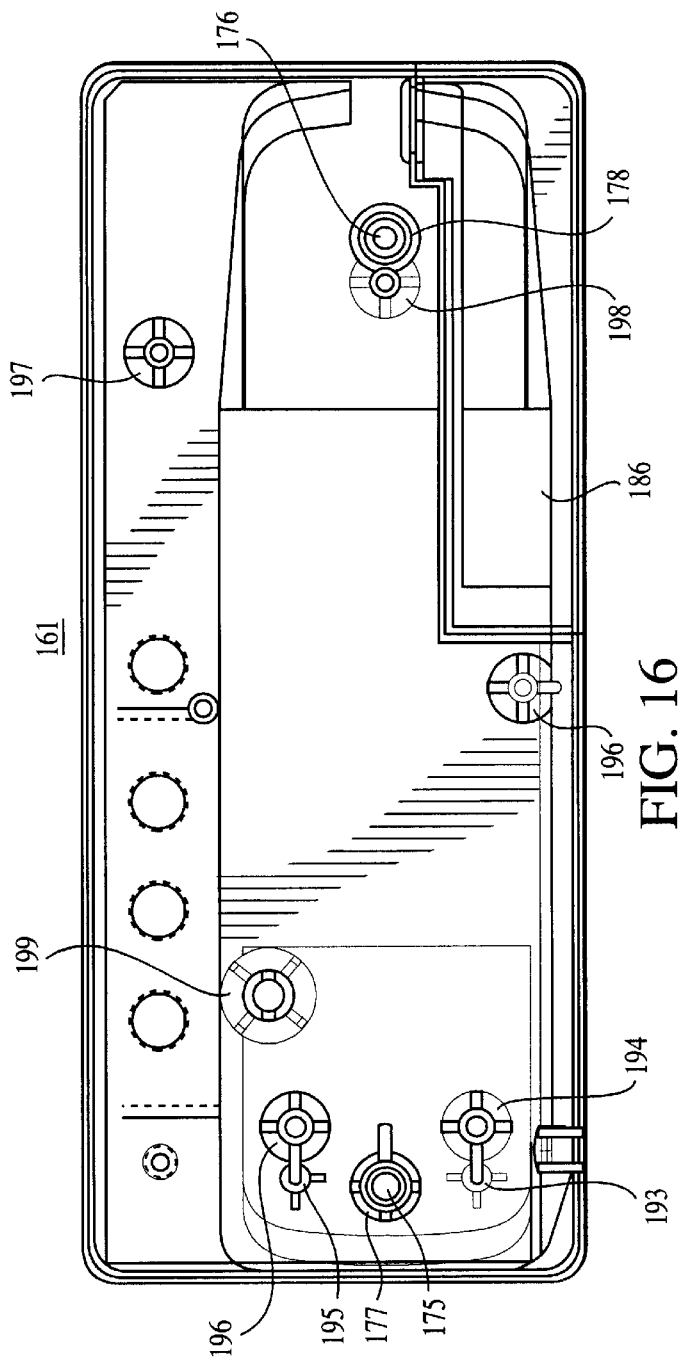
FIG. 16 is a cross-sectional view of the lower case of the paging amplifier for a cellular phone according to the embodiment of the present invention.

FIGS. 15 and 16 show a cross-sectional view and a bottom view of the upper case 161. The lower end of the bosses 193 through 199 provided in the inner surface of the upper case 161 and the lower surface of the step of the bosses 177 and 178 are located in a plane. The bosses 193 through 199 and the bosses 177 and 178 support one surface of the printed circuit board 163.

FIGS. 13 and 14 show a top view and a cross-sectional view of the lower case. The upper ends of the bosses 201 through 212 are located in a plane. The bosses 201 through 205 and bosses 206 and 212 face (i.e., are aligned with) the bosses 193 through 199 and bosses 177 and 178 in the upper case. The bosses 201 through 212 support another surface of the printed circuit board 163. Thus, the printed circuit board 163 is sandwiched between the bosses of the upper case and the bosses of the lower case. Thus, the printed circuit board is mounted between the upper case 161 and the lower case 162. The printed circuit board 163 has engaging holes that engage with the bosses 177 and 178 corresponding to the screw holes 175 and 176. Thus, the position of the printed circuit board 163 is determined by inserting the bosses 177 and 178 into the engaging holes, and is fixed by tightening the screws. The bosses 207 through 210 of the lower case 162 face the volume controllers 180 through 182 and the switch 183, and receive the pressing power applied to the volume controllers 180 through 182 and to the switch 183. Thus, the volume controllers 180 through 182, the switch 183, the printed circuit board 163 and the lower case 162 are prevented from deforming and collapsing.

The paging amplifier for a cellular phone according to the present invention is capable of being mounted on a wall, a pillar (i.e., a post) or a ceiling by inserting screws into the screw holes 175 and 176. The paging amplifier can be mounted on an inclined wall or pillar, or on a sloped or inclined overhang. Since the screw holes 175 and 176 are resin-molded and extend to the outside surface of the lower case, the screws can be tightened as much as the strength of the resin-molded upper case. In addition, since the screw holes 175 and 176 extend to the outside surface of the lower case, water, liquids and moisture entering the screw holes pass through the screw holes to the outside of the lower case; thus, main body of the paging amplifier is prevented from having water intruding therein.

Figure 9:
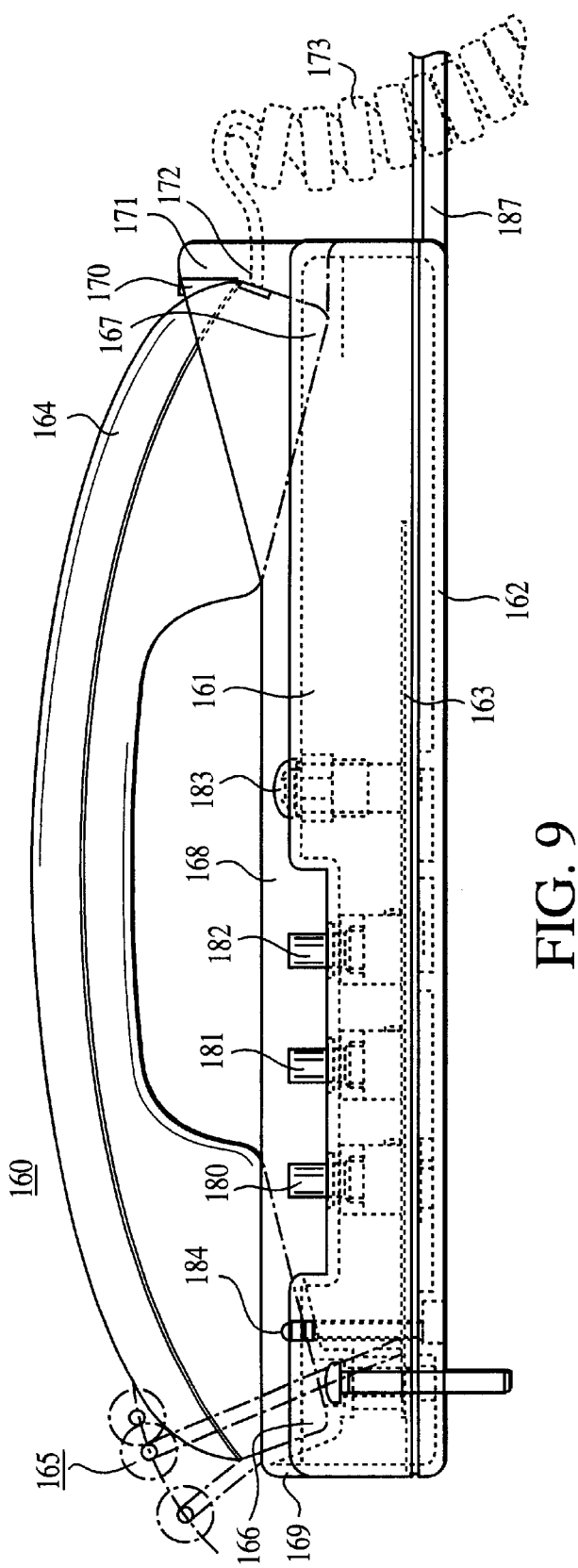
FIG. 9 is a front-elevation view of the paging amplifier for a cellular phone according to the embodiment of the present invention.
Figure 10:
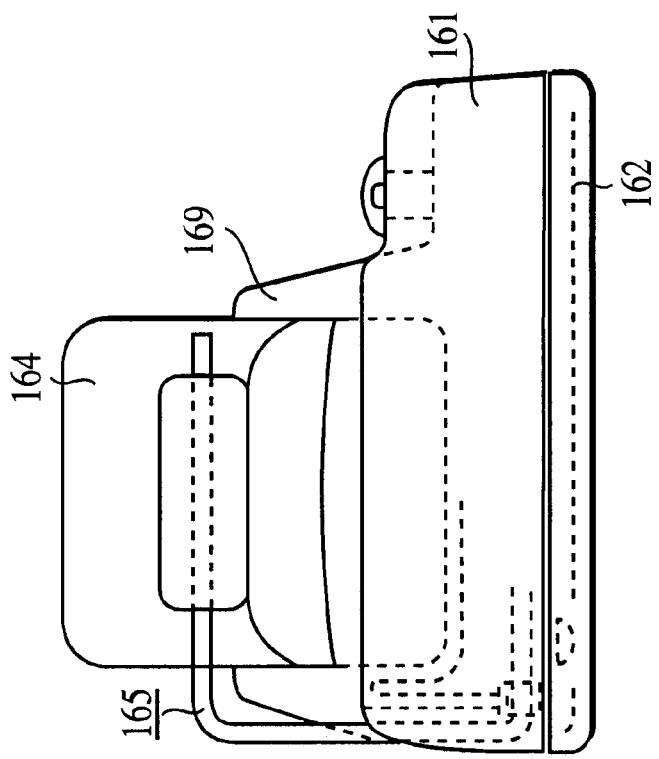
FIG. 10 is a left side view of the paging amplifier for a cellular phone according to the embodiment of the present invention.
Figure 17:
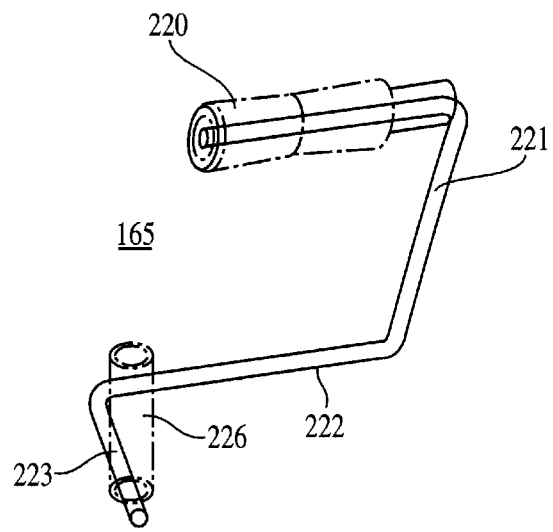
FIG. 17 is a drawing illustrating a handset support member.
Figure 18:
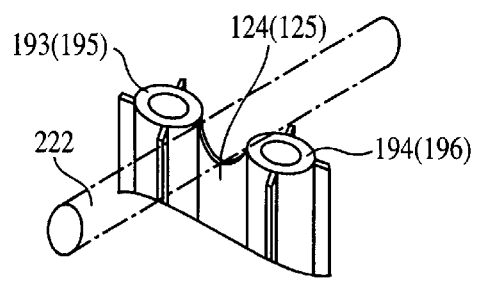
FIG. 18 is a drawing illustrating bosses 193, 194 and a rib 224 (225).

FIG. 17 shows a structure of the handset support member 165. The handset support member 165 has a pressing portion 220 located at the upper side of the handset 164, an arm portion 221, a shaft portion 222 located at the lower side of the handset mounting portion 168, and a stopper portion 223. The handset support member 165 is formed by bending a rod made of a material, such as a steel or a stainless steel, that does not have any significant elasticity, flexibility and bendability. A pressing roller provided at the pressing portion 220 is separated in the longitudinal direction and a speednut is engaged with a side of the pressing roller remote from the arm portion 221. The shaft portion 222 acts as the center axis of the rotation of the handset support member 165. Thus, the handset support portion rotates around the shaft portion 222 so that the handset pressing portion 220 is moved between a pressing position and a release position. In the pressing position, the handset pressing portion 220 presses the upper side of the handset toward the main body. As shown in FIG. 9, in the release position, the handset pressing portion 220 releases the handset, and is located at the front side of the handset. As shown in FIG. 18, ribs 224 and 225 are formed between the bosses 193 and 194 and between the bosses 195 and 196 provided on the inner side of the upper case 161, respectively. Each of the ribs 224 and 225 has a recess. The recesses of the ribs 224 and 225 are respectively located at the right end and the left end of the shaft portion 222 and support the shaft portion 222 from the front and rear sides. The shaft portion 222 is sandwiched between the recesses of the ribs 224 and 225 and the printed circuit board 163. Thus, the shaft portion 222 is rotatably supported from the upper and lower sides. One end of the shaft portion 222 is bent at the right angle to form the stopper portion 223. The stopper portion 223 is extended to the boss 199 and is pressed by a compressing spring 226 provided inside the boss 199 so that the pressing portion 220 is located at the upper side of the handset 164.

Figure 19:
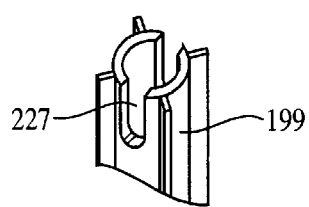
FIG. 19 is a drawing illustrating a boss 199.

On the other hand, as shown in FIG. 19, the boss 199 has a groove 227 that engages with the stopper portion 223. The groove 227 limits the rotation of the stopper portion 223 so that the handset support member stops at the release position of the handset. The length of the handset between the center of the rotation in the hand side (microphone side) and the position where the shaft portion 222 is mounted, the length of the arm portion 221, the rotation angle, the thickness of the handset at the tip side (speaker side), the curvature of the hand set at the point pressed by the pressing portion, a smoothness of the surface and so on are considered to determine the pressing position and the release position. In particular, the length of the handset between the center of the rotation in the hand side (microphone side) and the position where the shaft portion 222 is mounted, the length of the arm portion 221, the rotation angle are the most important factors. Beyond these factors, the thickness of the handset at the tip side (speaker side), the curvature of the hand set at the point pressed by the pressing portion, and the smoothness become important.

The paging amplifier of the present invention is configured as described above and is assembled as described in the following. First, the spring 226 is inserted into the boss 199 provided on inner surface of the upper case. The shaft portion 222 of the handset support member 165 is engaged with the recesses of the ribs 224 and 225. Next, the engaging holes of the printed circuit board are engaged with the bosses 177 and 178 for positioning of the printed circuit board. Then, the printed circuit board is fixed to the upper case by screws. The lower case 162 is positioned with respect to the upper case 161 and tightened by five screws. Then, the lid 185 of the code case is mounted. Thus, the assembly of the paging amplifier is completed. Finally, the modular plug of the connection cord 173 is inserted into the modular jacks of the main body of the paging amplifier and the handset to provide a connection therebetween.

When the handset 164 is positioned on the mounting portion of the main body of the paging amplifier, the hand side (microphone side) of the handset is inserted into the second recess (hooking portion) 167 in the hand side (microphone side) of the upper case. Then, the tip side (speaker side) of the handset is rotated around the hand side of the handset and is engaged with the tip side recess portion 166. At this time, the handset support member 165 engages the tip side of the handset. However, when the tip of the handset presses the pressing portion 220, the pressing portion 220 rotates around the shaft portion 222. When the handset support member 165 rotates around the shaft portion 222, the pressing portion 220 moves from the position where the tip of the handset hits the pressing portion 220, to the release position. Accordingly, the handset 164 is mounted on the handset mounting portion 168. Then, since the handset pressing portion 220 is pressed by the spring 226 so as to move to the pressing position, the handset 164 is engaged with the hand side recess 167 at one end and is fixed by the handset support member at another end.

When the handset 164 is picked up and removed from the main body of the paging amplifier, the tip side of the handset is rotated around the hand side of the handset, and is pulled against the pressing strength of the handset supporting member 165. Then, the pressing portion 220 slides along the upper surface of the handset 164 and the arm portion 221 rotates around the shaft portion 222. Thus, since the handset support member 165 moves to the release position, the handset 164 can be disengaged. After the handset is disengaged, the handset support member 165 moves to the pressing position by the pressing strength of the spring 226.

First Embodiment

FIG. 1 shows an example in which a cellular phone with a remote control function, such as a Digital MOVA P201 (trade name) of NTT DOCOMO (company), is connected to a paging amplifier for the cellular phone according to the present invention. The remote control function is normally used by connecting with, for example, a switch of an earphone microphone. The action of the switch provided on the earphone microphone is input to the remote control function and invokes the remote control function to connect or disconnect the telephone line. Thus, when receiving a telephone call, the user can start talking through the earphone microphone by operating the switch provided on the earphone microphone, and without any operation on the body of the cellular phone. A main body of the paging amplifier 3 is fixed to, for example, a wall of a cabin. The cellular phone 1 or 1a and the paging amplifier 3 for the cellular phone are connected with each other by inserting the plug 8 into the earphone microphone jack 2. The paging amplifier 3 for the cellular phone is connected to an external speaker 24 which is located outside of the cabin, such as an upper portion of a ship, or is located at a place remote from the main body, via a connection line.

An earphone microphone jack 2 of the cellular phone 1 is connected to a cord 4 of the paging amplifier 3 via plug 8. The cord 4 includes four lines, i.e., an earphone line 5, a microphone line 6, a control line 7 and ground line 9. An earphone terminal 11, a microphone terminal 12, a control terminal 13 and ground terminal 14 of the cellular phone are connected to an earphone input terminal 15, microphone output terminal 16, a control terminal 17 and a ground terminal 18 of the paging amplifier for the cellular phone via the earphone line 5, the microphone line 6, the control line 7 and the ground line 9, respectively. The control terminal 13 is connected to the remote control function of the cellular phone.

The earphone input terminal 15 of the paging amplifier for the cellular phone is connected to a calling sound volume controller 21 through a handset switch 20, and is further connected to an input of an amplifier 22. An output of the amplifier 22 is connected to an external speaker 24 via an output terminal 23 of the paging amplifier. Thereby, a calling sound (i.e., ringing tone) and a broadcast sound are amplified. The handset switch 20 is set to be in an ON state when the handset 25 is located at a predetermined position. The handset switch 20 is set to an OFF state when the handset is operated and removed from the predetermined position. In other words, the handset switch 20 is set to be in the ON state when the handset is hung on a hook of the paging amplifier for the cellular phone, and is set to be in the OFF state when the handset 25 is removed or picked up from the hook. In addition, the earphone input terminal 15 is connected to a speaker of the handset 25 through the controller 110 and the amplifier 26. Thus, a voice sound output from the cellular phone is amplified and the user can hear the amplified voice sound.

The microphone output terminal 16 is connected to a microphone of the handset 25 via an OFF-side terminal 27a of a broadcast switch 27. Thus, a voice sound signal input through the microphone of the handset 25 is sent to the cellular phone 1. An ON-side terminal 27b of the broadcast switch 27 is connected to a broadcast sound volume controller 28, and the output of the broadcast sound volume controller 28 is added to the input terminal of the amplifier 22 via a preamplifier 29. Accordingly, when the broadcast switch 27 is in the ON state, the sound signal input to the handset is amplified by the preamplifier 29 and the amplifier 22, and then is broadcasted through the external speaker 24.

The controllers 21, 110 and 28 relate to the switches 180, 181 and 182 while broadcast switch 27 relates to switch 183.

The control terminal 17 is connected to a ground 31 of the paging amplifier for the cellular phone via a timer 32 and a switch 30, which interlocks with the handset switch 20. A ground terminal 18 is connected to the ground 31 of the paging amplifier for the cellular phone.

The first embodiment of the present invention is configured as described above. Therefore, when the cellular phone receives a telephone call under a normal condition, the calling sound is transferred from the earphone terminal 11 of the cellular phone to the earphone input terminal 15 of the paging amplifier 3 via the earphone line 5. Here, the normal condition refers to a condition when the handset 25 is located at the predetermined position, i.e., is hung on the hook of the paging amplifier of the cellular phone, and the broadcast switch 27 is set to be in the OFF state. Since the earphone input terminal 15 is connected to the calling sound volume controller 21 via the handset switch 20, the sound volume of the calling sound can be adjusted. Then, the calling sound is amplified by the amplifier 22 and is broadcast through the speaker 24 via the speaker terminal 23, as shown in FIG. 3(*a*).

When the user picks up the handset 25 from the main body of the paging amplifier for the cellular phone after hearing the broadcast calling sound, an arm portion of a handset support member 165 (shown in FIG. 9) rotates around the shaft 222 so that the handset support member 165 moves to a release position. Thus, the handset can be picked up from the main body.

Then, when the handset 25 is picked up from the hook of the paging amplifier for the cellular phone, the handset switch 20 goes into OFF state, thus, the signal line from the earphone input terminal 15 to amplifier 22 is opened. Accordingly, the broadcast of the calling sound stops.

Simultaneously, when the handset 25 is picked up from the hook, the switch 30, which is interlocked with the switching of the handset switch 20, becomes ON for a second, and then is returned to be in the OFF state. The action of the switch 30 is transferred to the cellular phone via the timer 32, the control terminal 17 and the control terminal 13. Accordingly, the remote control function of the cellular phone is invoked and; thus, the line of contact is connected. The timer 32 is provided for continuing the signal of the action of the switch 30 for one second, for example, to ensure the invocation of the remote control function. However, it is possible to remove the timer 32, as shown in the second embodiment as will be discussed hereinbelow.

According to the connection of the line of contact, the earphone terminal 11 and the microphone terminal 12 of the cellular phone are connected to the earphone input terminal 15 and the microphone output terminal 16 of the paging amplifier for the cellular phone, respectively. The earphone input terminal 15 is connected to the speaker of the handset 25 via the amplifier 26. The microphone output terminal 16 is connected to the microphone of the handset 25 via the broadcast switch 27. Therefore, the condition is automatically switched from the stopping of the calling sound to the calling (speaking) condition. Accordingly, as shown in FIG. 3(*b*), the user can speak over the cellular phone by using the handset 25. In addition, under the speaking condition, since the amplifier 26 amplifies the voice sound output from the cellular phone, the user can hear the voice sound even if the voice sound is too low or the neighborhood (i.e., environment) is too noisy. If the voice sound output from the handset is too loud, the user can adjust the output voice sound volume by using the voice sound volume controller of the cellular phone.

When the handset 25 is put on the predetermined position (i.e. is hung on the hook) after the user finishes a call, the switch 30 becomes ON for a second, then returns to the OFF stat. When the action of the switch 30 is transferred to the cellular phone, the remote control function is invoked and the line of contact is disconnected.

In addition, in the first embodiment, when the broadcast switch 27 is switched from the OFF-side terminal 27a to the ON-side terminal 27b, the voice sound input through the microphone of the handset 25 passes through the broadcast sound volume 28 and preamplifier 29, and then is amplified by the amplifier 22. Subsequently, the amplified voice sound is broadcasted through the external speaker 24. The broadcast is stopped when the broadcast switch 27 is returned to OFF state. Even when calling, the broadcast can be performed by switching the broadcast switch 27 from the OFF-side terminal 27a to the ON-side terminal 27b. At this moment, since the circuit of the paging amplifier is separated from the microphone input terminal of the cellular phone, the contents of the broadcast is not heard by a person at the other end of the line.

The user can make a telephone call in an ordinary way, i.e., by picking up the handset and operating a send button and the dials (i.e., buttons) of the cellular phone. Alternatively, the user can pull out the plug 8, and make a telephone call by using the cellular phone alone.

Second Embodiment

Figure 2:
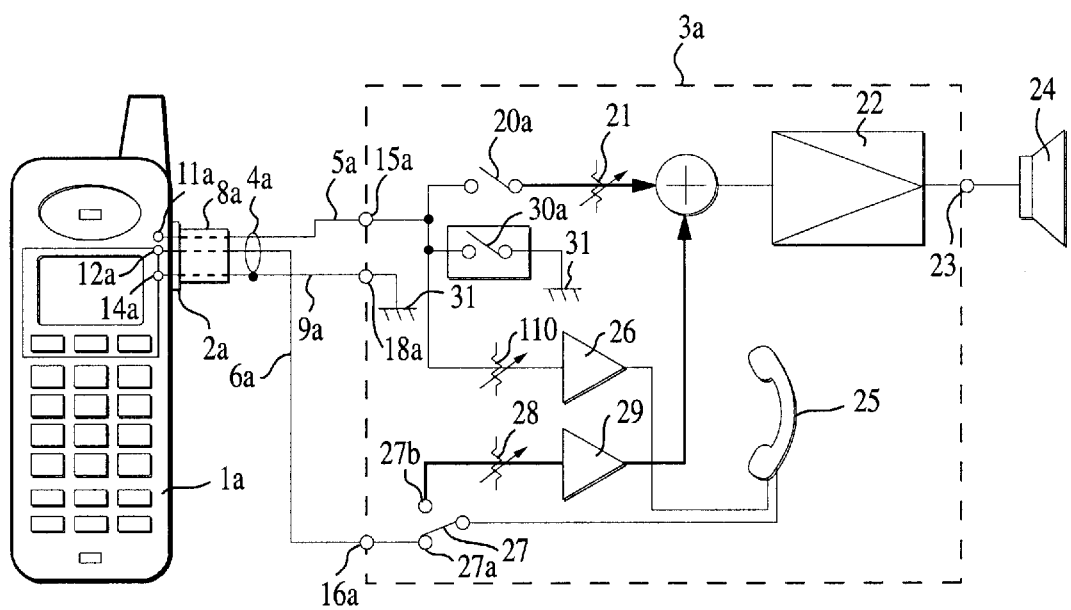
FIG. 2 is a circuit diagram of a paging amplifier for a cellular phone according to a second embodiment of the present invention.

FIG. 2 shows a second embodiment in which a cellular phone with a remote control function, manufactured by Kansai Cellular (company name), is connected to a paging amplifier for the cellular phone according to the present invention. An earphone microphone jack 2a of the cellular phone 1a is connected to a cord 4a of a paging amplifier 3a for the cellular phone via a plug 8a. The cord 4a has three lines, i.e. an earphone line 5a, microphone 6a and ground line 9a. An earphone-cum-control terminal 11a, a microphone terminal 12a and a ground terminal 14a of the cellular phone are connected to an earphone-cum-control input terminal 15a, a microphone output terminal 16a and a ground terminal 18a of the paging amplifier for the cellular phone via the earphone line 5a, the microphone line 6a and the ground line 9a, respectively. Thus, the remove control function is invoked by the input signal to connect and disconnect a telephone line. The earphone-cum-control terminal 11a serves as the earphone terminal 11 and the control terminal 13 in the first embodiment. A signal input to the earphone-cum-control 11a of the cellular phone activates the remote control function of the cellular phone. Thus, the remote control function is invoked by the input signal to connect and disconnect a telephone line.

The earphone-cum-control input terminal 15a of the paging amplifier for the cellular phone is connected to a calling sound volume controller 21 via a handset switch 20a, and is connected to an input of an amplifier 22. An output of the amplifier 22 is further connected to an external speaker 24 via an output terminal 23 of the paging amplifier. The amplifier 22 amplifies a calling sound and a broadcast voice sound. The handset switch 20a is set to be in an ON state, when the handset is located at the predetermined position. The handset switch 20a enters an OFF state, when the handset 25 is removed from the predetermined position. In other words, the handset switch 20a is set to be in the ON state when the handset 25 is hung on a hook of the paging amplifier for the cellular phone, while the handset switch 20a is set to be in the OFF state when the handset 25 is picked up from the hook. In addition, the earphone-cum-control input terminal 15a is connected to a speaker of the handset 25 via an amplifier 26. Thus, the voice sound output from the cellular phone is amplified and the user can hear the amplified voice sound output from the cellular phone through the speaker of the handset 25.

The microphone output terminal 16a is connected to a microphone of the handset 25 via an OFF-side terminal 27a of a broadcast switch 27. Thus, a voice sound signal input through the microphone of the handset 25 is sent to the cellular phone 1a. An output of an ON-side terminal 27a of the broadcast switch 27 is added to the input of the amplifier 22 through a broadcast sound volume controller 28 and a preamplifier 29. Therefore, when the broadcast switch is set to be ON state, the voice sound signal input through the handset is amplified by the preamplifier 29 and the amplifier 22, and then, is broadcasted through the external speaker 24.

A switch 30a, which is interlocked with the handset switch 20a, is connected to the earphone-cum-control input terminal 15a, and is also connected to a ground 31 of the paging amplifier for the cellular phone.

The ground terminal 18a is connected to the ground 31 of the paging amplifier for the cellular phone.

Figure 3A:
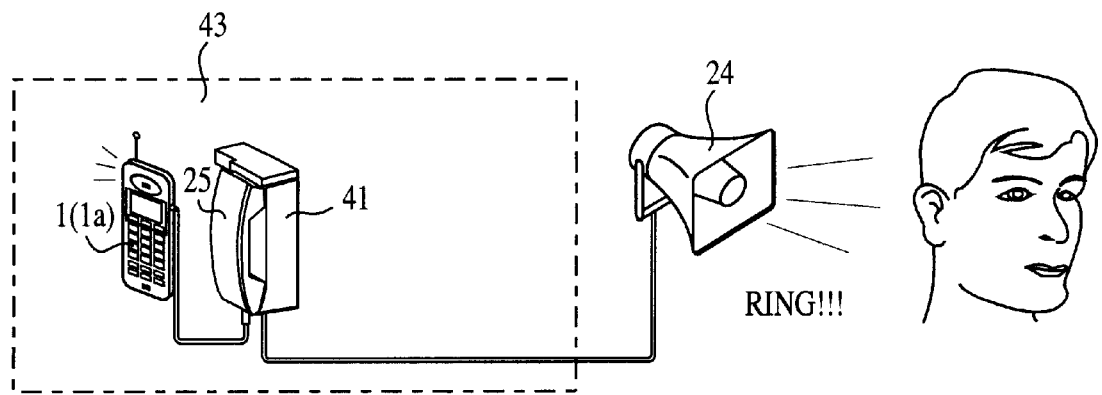
FIG. 3(a) is a drawing that illustrates a condition using the paging amplifier of the present invention to broadcast a calling sound of the cellular phone.

The second embodiment of the present invention is configured as described above. Therefore, when the cellular phone receives a telephone call under a normal condition, the calling sound is transferred from the earphone-cum-control terminal 11a of the cellular phone to the earphone-cum-control input terminal 15a of the paging amplifier 3a via the earphone line 5a. Here, the normal condition refers to a condition where the handset 25 is located at a predetermined position, i.e., is hung on the hook of the paging amplifier of the cellular phone, and the broadcast switch 27 is set to be in the OFF state. Since the earphone input terminal 15a is connected to the calling sound volume controller 21 via the handset switch 20a, the sound volume of the calling sound is adjusted. Then, the calling sound is amplified by the amplifier 22 and is broadcasted through the external speaker 24 through the speaker terminal 23, as shown in FIG. 3(a).

Then, when the handset 25 is picked up from the hook of the paging amplifier for the cellular phone, the handset switch 20a enters the OFF state. Thus, the signal line from the earphone-cum-control input terminal 15a to the amplifier 22 is opened. Accordingly, the broadcast of the calling sound stops. When the handset 25 is picked up from the hook, the switch 30a, which is interlocked with the handset switch 20a, enters the ON state for a second, and then returned to the OFF state. The action of the switch 30a is transferred to the cellular phone via the earphone-cum-control terminal 11a. According to the signal output in response to the action of the switch 30a, the remote control function is invoked. Thus, a line of contact is connected. A timer, such as the timer 32, can be inserted between the switch 30a and the earphone-cum-control input terminal 15a.

Figure 3B:
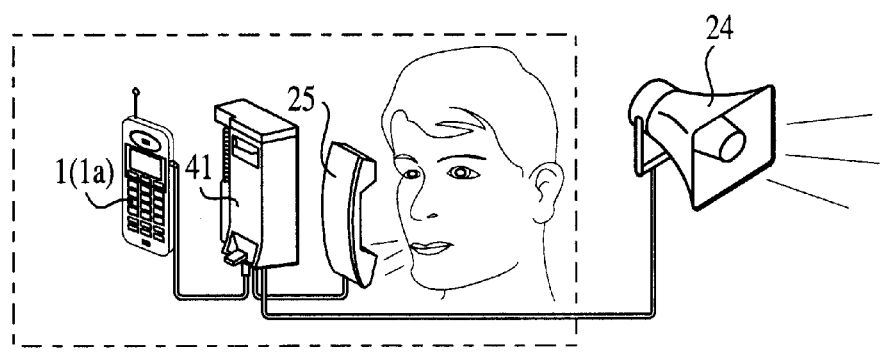
FIG. 3(b) is a drawing that illustrates a condition using the paging amplifier of the present invention to speak through the handset.

According to the connection of the line of contact, the earphone-cum-control terminal 11a and the microphone terminal 12a of the cellular phone are connected to the earphone-cum-control input terminal 15a and the microphone output terminal 16a of the paging amplifier for the cellular phone, respectively. The earphone-cum-control input terminal 15a is connected to the speaker of the handset 25 through the controller 110 and the amplifier 26. The microphone output terminal 16a is connected to the microphone side of the handset 25 via the broadcast switch 27. Accordingly, the user can speak through the cellular phone by using the handset 25, as shown in FIG. 3(b).

In this embodiment, the user can start a conversation over the phone by pushing a send button. In addition, while calling, since the amplifier 26 amplifies the voice sound output from the cellular phone, the user can hear the voice sound even if the voice sound is too low or the surroundings or environment are too noisy. If the output voice sound of the handset is too loud, the user can adjust the voice sound output from the handset 25 using the voice sound volume controller of the cellular phone.

When the handset 25 is put on the predetermined position (i.e. is hung on the hook) after the user finishes a call, the switch 30a enters the ON state for a second, and then returns to the OFF state. The action of the switch is transferred to the cellular phone and the remote control function is invoked. Thus, the line of contact is disconnected.

In addition, in the second embodiment, when the broadcast switch 27 is switched from the OFF-side terminal 27a to the ON-side terminal 27b, the voice sound input through the microphone of the handset 25 is amplified by the amplifier 22, and is broadcasted through the external speaker 24. The broadcast is stopped when the broadcast switch 27 is returned to OFF state. Even when calling, the broadcast can be performed by switching the broadcast switch 27 from the OFF-side terminal 27a to the ON-side terminal 27b. At this time, since the circuit of the paging amplifier is separated from the microphone input terminal of the cellular phone, the contents of the broadcast is not heard by the other end of the line.

The user can make a telephone call in an ordinary way, i.e., by picking up the handset and operating a send button and the dials (i.e., button) of the cellular phone. Alternatively, the user can pull out the plug 8, and make a telephone call by using the cellular phone alone.

Third Embodiment

In the first and second embodiments described above, the plug and the circuit board of the paging amplifier for a cellular phone is changed according to the types of the earphone microphone jack (three or four line type) of the cellular phones with which it is to be used. In other words, in the first embodiment, the paging amplifier for the cellular phone has an earphone input terminal, a microphone output terminal, a control terminal and a ground terminal, and uses four-port plug. In the second embodiment, the paging amplifier for the cellular phone has an earphone-cum control input terminal, a microphone output terminal and a ground terminal and uses three-port plug. In the third embodiment, instead of changing the plug and the circuit board of the paging amplifier for the cellular phone according to the types of the earphone microphone jacks, a plug is provided corresponding to each type of earphone microphone jack and a single circuit board of the paging amplifier for the cellular phone is commonly used.

Figure 4:
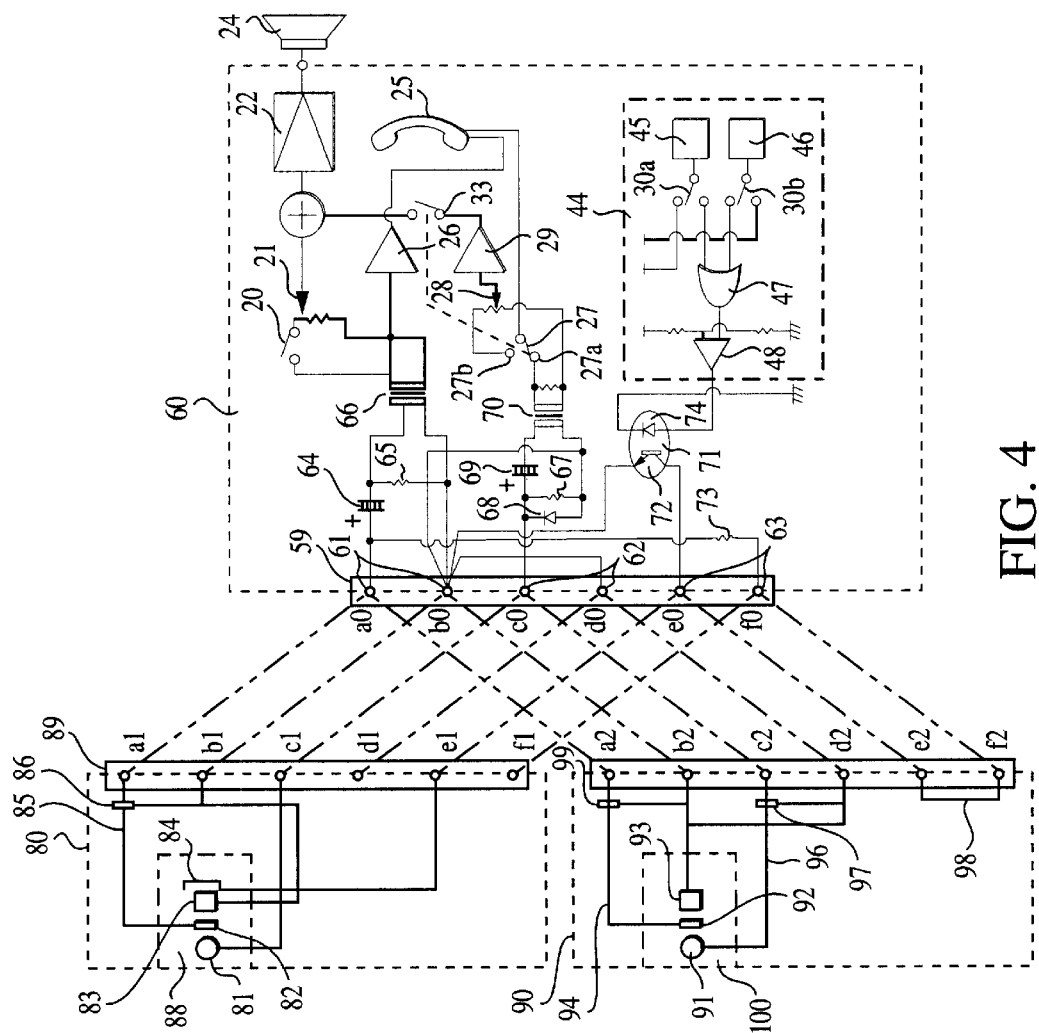
FIG. 4 shows a connector connection of 3-electrode earphone plug and 4-electrode earphone plug.

FIG. 4 shows a circuit configuration of the third embodiment according to the present invention. A circuit board 60 of the paging amplifier is commonly used with the cellular phones described in the first and second embodiments. To connect the cellular phones to the circuit board, a four-port earphone plug 80 corresponding to the four-line type earphone microphone jack and a three-port earphone plug 90 corresponding to the three-line type earphone microphone jack are provided.

In the circuit board 60, terminals a0 and b0 constitute an earphone input terminal 61, terminals c0 and d0 constitute a microphone output terminal 62, and terminals e0 and f0 constitute a control terminal 63. Here, terminals b0 and d0 are electrically connected with each other. In order to avoid ground lines from forming a loop, the ground lines in the circuit board 60 are converged to the terminal b0 as much as possible; thus, a one-point ground is realized. These terminals a0 through f0 are connected to a six-port modular jack 59 mounted on the circuit board 60.

The terminal a0 of the earphone input terminal 61 is connected to a transformer 66 via a coupling electrolytic condenser 64 and a resistance 65. The configuration after the transformer 66, i.e., the connection among the handset switch 20, the calling sound volume controller 21, the amplifier 22 and the external speaker 24, is the same as the configuration shown in the first or second embodiment.

The terminal c0 of the microphone output terminal 62 is connected to one terminal of a transformer 70 via a resistance 67, a zener diode 68 and a coupling electrolytic condenser 69. Another terminal of the transformer 70 is connected to the terminal b0 for grounding. After the transformer 70, same as the first or the second embodiment, lines are extended to connect to the microphone of the handset 25 via the OFF-side terminal 27a of the broadcast switch 27. The output of the ON-side terminal 27b is added to the input of the amplifier 22 via the broadcast sound volume 28 controller and the preamplifier 29. In this embodiment, a switch 33 is inserted between the preamplifier 29 and the amplifier 22 so as to prevent noise from being output through the external speaker. Thus, when the broadcast switch is in the ON state, the voice sound signal input through the handset is amplified by the preamplifier 29 and the amplifier 22, and then is output through the external peaker 24.

The terminal e0 of the control terminal 63 is connected to the connector of a photo-receptive transistor 72 in a photo-coupler 71. The emitter of the photo receptive transistor 72 is connected to the terminal b0 for ground. The terminal f0 is connected to the terminal a0 via a resistance 73. After a light-emitting diode 74 of the photo-coupler 71, the line is connected to a pulse generator 44 that generates a pulse for about one second when the switch 30a and 30b, which are interlocked with the handset switch 20, are changed between the ON and OFF state.

The pulse generator 44 includes a first pulse generator 45 and a second pulse generator 46. The first and second pulse generators 45 and 46 are respectively connected to switches 30a and 30b, which is interlocked with the hook switch 20. The switches 30a and 30b are connected to a comparator 48 via an OR circuit 47. The output of the comparator 48 is connected to the light-emitting diode 74.

The pulse generated by the pulse generator is transferred to the cellular phone and invokes the remote control function of the cellular phone. By providing the pulse generator, instead of the single switch or a combination of a switch and a timer as shown in the first or second embodiments, the operation of the handset can surely be transferred to the cellular phone.

Figure 5:
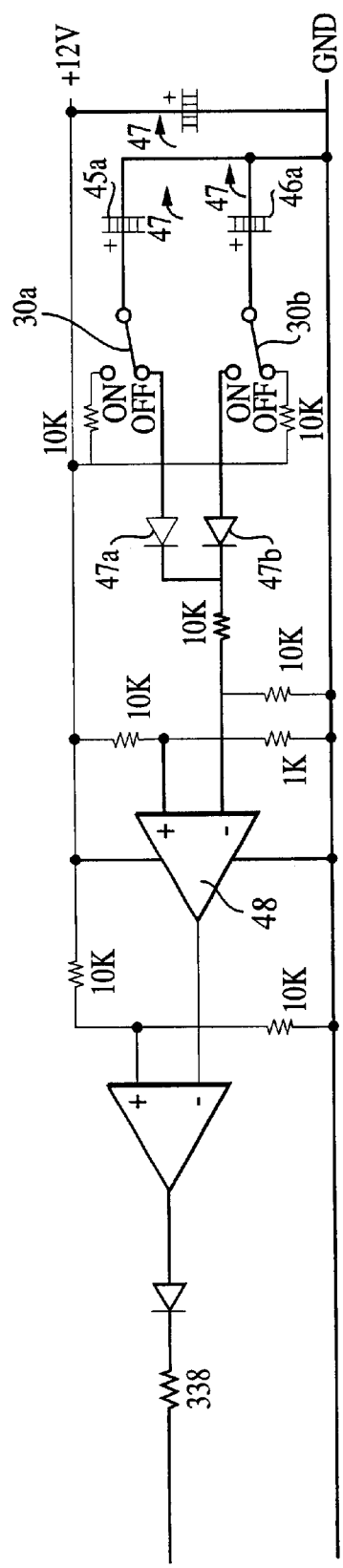
FIG. 5 is a circuit diagram illustrating an example of the pulse generator 44.
Figure 6:
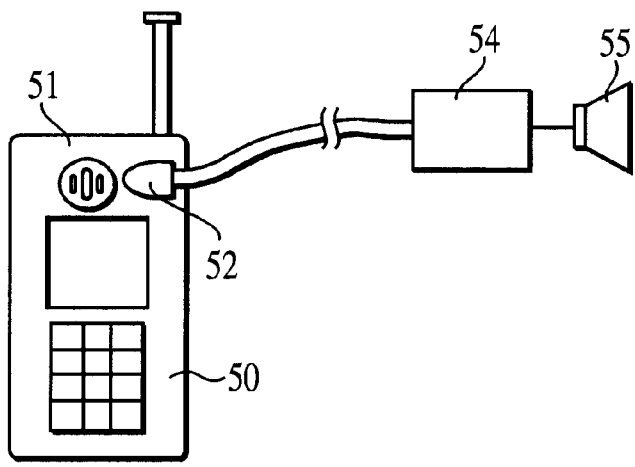
FIG. 6 is a schematic diagram illustrating a conventional Call Speaker for a cellular phone.
Figure 7:
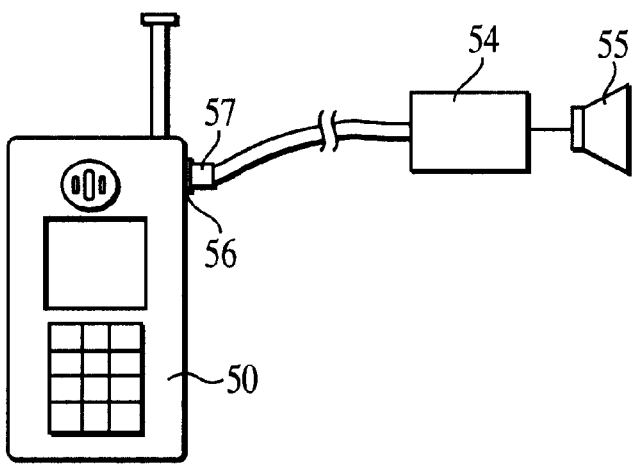
FIG. 7 is a schematic diagram illustrating another conventional Call Speaker for a cellular phone.
Figure 8:
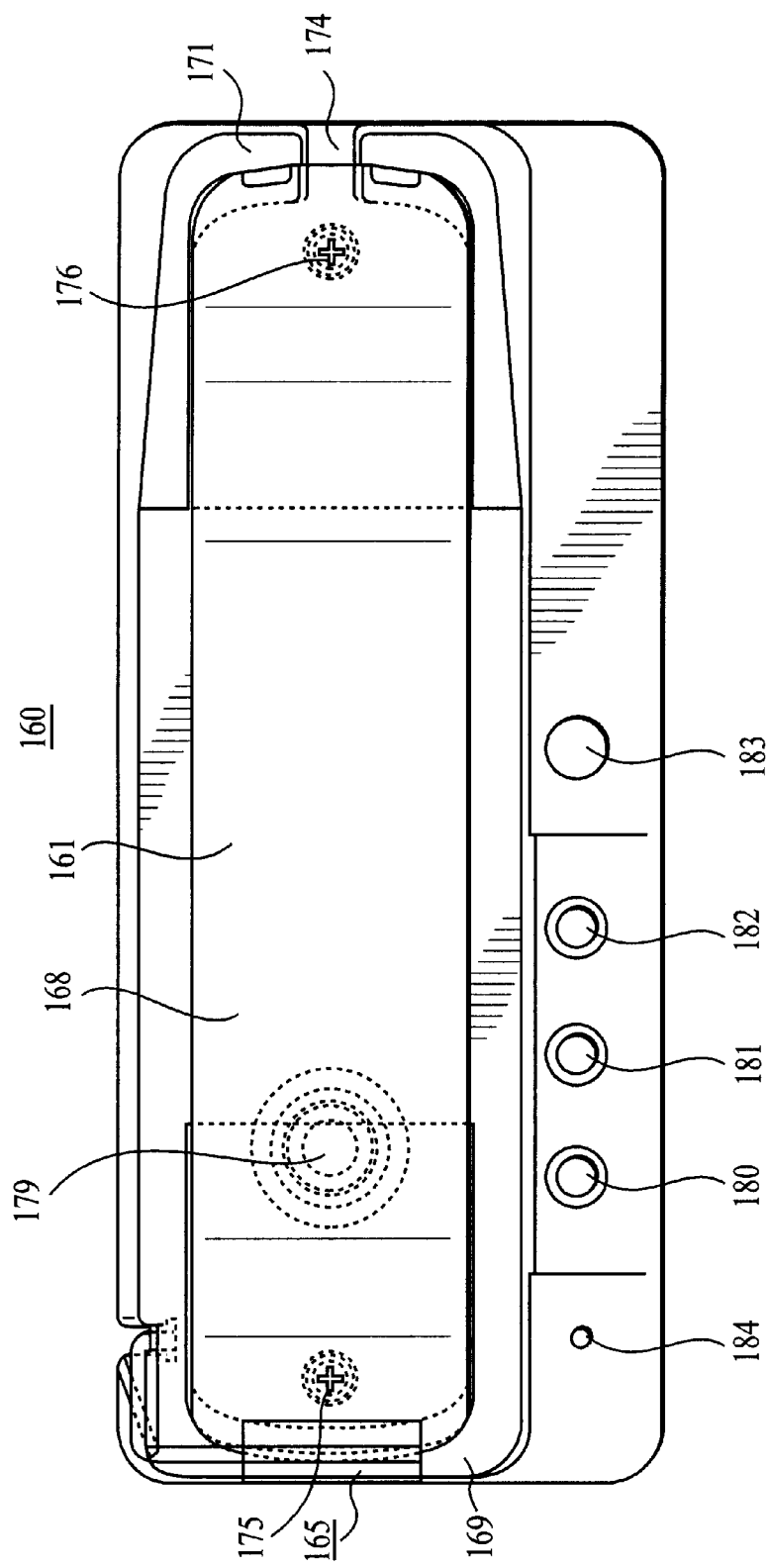
FIG. 8 is a top view of the paging amplifier for a cellular phone according to the embodiments of the present invention.

FIG. 5 shows a detail of the pulse generator 44. The first pulse generator 45 and the second pulse generator 46 are made of electrolytic condensers 45a and 46a, respectively. The switches 30a and 30b are a hook-on detection switch and a hook-off detection switch. The ON-side terminal of the switch 30a is connected to an electric source line via a low resistance of about 10 kiloohms. The OFF-side terminal of the switch 30a is connected to a diode 47a, which is included in the OR circuit 47. The OFF-side terminal of the switch 30a is connected to the electric source line via the low resistance about 10 kiloohms. The ON-side terminal of the switch 30b is connected to the diode 47b, which is included in the OR circuit 47. The OR circuit 47 includes the diodes 47a and 47b. The comparator 48 is made of an op-amplifier. A reference voltage is resistance-divided and is added to the plus-side terminal of the comparator 48. The output of the OR circuit 47 is input to the minus-side terminal of the comparator 48.

In the circuit shown in FIG. 5, when the handset switch 20 changes from the ON to the OFF state, the switches 30a and 30b, which are interlocked with the handset switch 20, change from the ON to the OFF state. Therefore, the electrolytic condenser 45a discharges through a discharging circuit, i.e., the diode 47a and two resistances, via the OFF-side terminal of the switch 30a. On the other hand, the electrolytic condenser 46a is connected to the electric source line via the on-side terminal of the switch 30b and the low resistance. Thus, the electrolytic condenser 46a is charged. The comparator 48 compares the change in the electric potential generated by the discharge of the electrolytic condenser 45a and the charge of the electrolytic condenser 46a with the reference voltage. Then, the comparator 48 outputs a rectangular pulse. In this embodiment, the reference voltage is set so that the pulse duration is about one second.

When the handset switch 20 changes from the OFF to the ON state, the switches 30a and 30b, which are interlocked with the handset switch 20, changes from the OFF to the ON state. Therefore, the electrolytic condenser 45a is connected to the electric source line via the on-side terminal and the low resistance. Thus, the electrolytic condenser 45a is charged. On the other hand, the electrolytic condenser 46a discharges through a discharging circuit, i.e., the diode 47b and two resistances, via the OFF-side terminal of the switch 30b. The comparator 48 compares the change of the electric potential generated by the discharge of the electrolytic condenser 45a and the charge of the electrolytic condenser 46a with the reference voltage. Then, the comparator 48 outputs a rectangular pulse. In this embodiment, the reference voltage is set so that the pulse duration is about one second. As described above, the pulse generator 44 generates a pulse for one second in response to the state change (ON to OFF, and OFF to ON) of the handset switch 20.

The four-terminal earphone plug 80 used with the four-line type earphone microphone jack has four ports. The first terminal 81 provided on the tip is connected to the terminal c1. The second terminal 82 is connected to the terminal a1. The third terminal 83 is connected to the terminal b1 as well as a shield line 86 of a connection line 85, which connects the second terminal 82 and the terminal a1. The fourth terminal 84 is connected to the terminal e1. As shown in the figure, the terminals d1 and f1 are empty terminals. These terminals a1 though f1 are provided on a six-port modular jack 89.

The three-port earphone plug 90 used with the three-line type earphone microphone jack has three terminals. The first terminal 91 on the tip is connected to a terminal c2. The second terminal 92 is connected to a terminal a2. The third terminal 93 is connected to terminals b2 and d2 as well as a shield line 95 of the connection line 94, which connects the second terminal 92 and the terminal a2, and a shield line 97 of the connection line 96, which connects the first terminal 91 and the terminal c2. The terminals e2 and f2 are short-circuited by a jumper line 98. These terminals a2 though f2 are provided on a six-terminal modular jack 99.

When the circuit board 60 of the paging amplifier for the cellular phone is connected to the cellular phone described in the first embodiment, the four-port earphone plug 80 is used. Thus, the six-port modular plug 89 is inserted into the six-port modular jack 59 of the paging amplifier for the cellular phone. According to the connection between the six-port modular plug 89 and the six-port modular jack 79, the terminals a0, b0, c0, d0, e0 and f0 are connected to the terminals a1, b1, c1, d1, e1 and f1, respectively. Then, the four-port plug 88 is inserted into the earphone microphone jack 2 (shown in FIG. 1) of the cellular phone; thus, the cellular phone and the paging amplifier for the cellular phone are connected with each other.

The explanation of the operations regarding broadcast of a calling sound, connection and disconnection of the line of contact, broadcast from the handset and sending a telephone call is omitted here, since these operations are the same as the first embodiment.

When the circuit board 60 of the paging amplifier for the cellular phone is connected to the cellular phone described in the second embodiment, the three-port earphone plug 90 is used. Thus, the six-port modular plug 99 is inserted into the six-port modular jack 59 of the paging amplifier for the cellular phone. Then, the three-port plug 100 is inserted into the earphone microphone jack 2a (shown in FIG. 2) of the cellular phone; thus, the cellular phone and the paging amplifier for the cellular phone are connected with each other. According to the connection between the six-port modular plug 99 and the six-port modular jack 59, the terminals a0, b0, c0, d0, e0 and f0 are connected to the terminals a2, b2, c2, d2, e2 and f2, respectively.

The explanation of the operations regarding the broadcast of a calling sound, connection and disconnection of the line of contact, broadcast from the handset and sending a telephone call is omitted here, since these operations are the same as the second embodiment.

In the third embodiment, the example in which the paging amplifier is connected to the two types of the cellular phones having a four-port earphone microphone terminal and a three-port earphone terminal, is explained. However, the present invention is not limited to these two types having four and three terminals. Other types having different numbers of terminals can also be utilized. Further, in the fourth embodiment, the six-port modular jack and the six-port modular plug are used to connect the earphone plug of the cellular phone and the circuit board of the paging amplifier for the cellular phone. However, the form of the jack and plug is not limited to the modular types used in the third embodiment. Rather, any arbitrary type of jack and plug can be used. In the first through third embodiments, the plug of the paging amplifier for the cellular phone is inserted into the earphone microphone jack of the cellular phone so as to connect the cellular phone and the paging amplifier. However, the earphone microphone terminals of the cellular phone can be directly connected to the input/output terminals of the paging amplifier for the cellular phone.

According to the present invention, when the handset is located at the predetermined position, the paging amplifier for a cellular phone amplifies a calling sound of the cellular phone and outputs the amplified sound through an external speaker and a speaker of the handset. Therefore, the user does not miss hearing the amplified calling sound. When the handset is operated (removed from the predetermined position), the calling sound stops and the user can speak over the telephone by using the handset.

According to the present invention, since the cellular phone and the paging amplifier for the cellular phone are connected with each other, after the calling sound stops, the user can continuously speak over the telephone by using the cellular phone without any additional operation, to enable the user to speak over the telephone by using the handset. Thus, the user can use the cellular phone conveniently.

Further, according to the present invention, when a broadcast switch is operated to be in the ON state, the voice sound signal input through the handset is amplified and broadcast through an external speaker.

Furthermore, according to the present invention, the plug of the paging amplifier for a cellular phone is inserted to an earphone microphone jack of the cellular phone so as to connect the cellular phone and the paging amplifier with each other. Accordingly, the paging amplifier of the present invention can be used with the cellular phone without requiring any modification of the cellular phone.

In addition, according to the present invention, by using the broadcast switch, broadcast can be performed either while calling or not calling through the handset.

Further, according to the present invention, the handset is pressed by a handset hooking portion at one end and is also pressed by a handset support member at another end. Thus, the handset is firmly fixed to the body of the paging amplifier. Accordingly, even if the paging amplifier for the cellular phone is attached on a ceiling or an inclined portion of an overhang, as well as on a wall and a pillar, the paging amplifier stably holds the handset, increases reliability even in the presence of large vibrations, swinging and rolling, and makes the handset easier to be hung up and be picked up from the main body of the paging amplifier.

Further, the handset hook portion is integrally formed with the upper case, on which the handset mounting portion of the body of the paging amplifier is provided. Accordingly, the strength of the handset hook portion can be increased. In addition, since the handset hook portion can be manufactured by resin molding as an integral structure, the manufacturing process is simplified. Further, the handset hook portion is provided on the connection cord side; thus, the handset connection cord is positioned at the hand side. Accordingly, the handset is picked up from the handset connection cord side. Therefore, the handset connection cord does not become an obstacle to the hang-up and pick-up operation of the handset.

Further, the tip of the handset (speaker side of the handset) is easily rotated around the handset hook portion so that the handset is engaged with and disengaged from the handset support member. Thus, the overhang portion prevents the handset from dropping out of the body.

Further, the handset support member rotates around the shaft portion so as to move between the pressing position of the handset and the release position of the handset. Thus, the handset support member firmly holds the handset with reliability even in the presence of large vibrations, swinging and rolling. In addition, the disengagement and engagement of the handset become easier. The handset pressing portion, arm portion, shaft portion can be integrally formed by bending a rod made of, e.g., a steel or a stainless steel. Thus, manufacturing of the handset support member becomes easier.

Further, since the shaft portion is sandwiched between the upper case and the lower case of the body of the paging amplifier, the structure is simple and the assembly is easy. Further, a special bearing member is not required. Accordingly, the cost can be reduced.

In addition, the stopper is also integrally formed with the pressing portion, the arm and the fulcrum (shaft) by bending a rod made of e.g., a stainless steel. Thus, manufacturing further becomes simpler and assembly becomes easier. Further, the strength of the handset support member is increased.

The present disclosure relates to subject matter contained in priority Japanese Application Nos. 10-378002 filed on Dec. 15, 1998 and 11-96763 filed on Feb. 25, 1999 the entire disclosures of which are expressly incorporated herein by reference in their entireties.

It is noted that the foregoing examples and embodiments have been provided merely for the purpose of explanation and are in no way to be construed as limiting of the features of the present invention. While the present invention has been described with reference to exemplary embodiments, it is understood that the words which have been used herein are words of description and illustration rather than words of limitation. Changes may be made within the scope of the appended claims, as presently set forth and as amended, without departing from the scope and spirit of the present invention in its various aspects. Although the present invention has been described herein with reference to particular means, materials, and embodiments, the present invention is not intended to be limited to the particulars disclosed herein; rather, the present invention extends to all functionally equivalent structures, methods and uses such as are within the scope of the appended claims.

What claimed is:

1. A paging amplifier for use with a cellular phone, comprising:

an input/output terminal connectable to an earphone microphone terminal of the cellular phone;

an output terminal connected to an external speaker;

a handset having a microphone and a speaker;

an amplifier that receives a calling sound from the cellular phone through the earphone microphone terminal and the input/output terminal, amplifies the calling sound and outputs the calling sound to the external speaker through the output terminal; and a detector that detects whether or not the handset is located in a predetermined position, the detector stopping the calling sound when a detection is made that the handset is removed from the predetermined position.

2. A paging amplifier for use with a cellular phone, comprising:

a handset having a microphone and a speaker, the microphone being capable of inputting a sound;

an input/output terminal connected to the handset, the input/output terminal being connectable to an earphone microphone terminal of the cellular phone; and an amplifier;

wherein the sound input through the microphone of the handset is transmitted to the cellular phone via the input/output terminal provided on the paging amplifier, and a sound signal output from the cellular phone is transmitted to the speaker of the handset via the input/output terminal and the amplifier so that the voice sound signal is amplified and output from the speaker of the handset.

3. The paging amplifier for the cellular phone according to claim 2, wherein the input/output terminal includes a first microphone terminal of the paging amplifier, the first microphone terminal connected to the microphone of the handset;

the paging amplifier further comprising:
   a broadcast switch inserted between the first microphone terminal and the microphone provided on the handset, the broadcast switch being switchable between an ON state and an OFF state, wherein, when the broadcast switch is set to the ON state, the microphone of the handset is connected to a second microphone terminal of the cellular phone via the first microphone terminal, and wherein, when the broadcast switch is set to the OFF state, the microphone of the handset is connected to an external speaker through the amplifier.

4. A paging amplifier for use with a cellular phone, comprising:

an on/off switch in a circuit connecting an earphone microphone terminal of the cellular phone and an external speaker, the on/off switch switching an output signal from the cellular phone between the external speaker and another speaker; and a switch that is interlocked with the on/off switch, the switch being connected to a control terminal of the cellular phone, the switch connecting and disconnecting a telephone connection of the cellular phone.

5. A paging amplifier for use with a cellular phone, comprising:

a handset having a speaker and a microphone; and a plug that is insertable into an earphone microphone jack of the cellular phone, wherein an earphone terminal of the cellular phone is connected to an external speaker via the plug, wherein the earphone terminal of the cellular phone is further connected to the speaker of the handset via the plug, and wherein a microphone terminal of the cellular phone is connected to the microphone of the handset via the plug.

6. A paging amplifier usable with first and second cellular phones, comprising:

a circuit board of the paging amplifier configured to be commonly usable with the first and second cellular phones;

a first earphone plug that connects the first cellular phone to the circuit board; and a second earphone plug that connects the second cellular-phone to the circuit board.

7. The paging amplifier according to claim 6, wherein the first cellular phone has a four-terminal earphone microphone jack, and the second cellular phone has a three-terminal earphone microphone jack, the first earphone plug has a four terminal plug connectable to the four-terminal earphone microphone jack of the first cellular phone, and the second earphone plug has a three-terminal plug connectable to the three-terminal earphone microphone jack of the second cellular phone.

8. The paging amplifier according to the claim 7, wherein the circuit board has an microphone input terminal, an earphone terminal, a ground terminal and two control terminals of the paging amplifier, wherein the four-terminal plug has a first terminal connected to the microphone input terminal, a second terminal connected to the earphone terminal, a third terminal connected to the ground terminal and a fourth terminal connected to one of the two control terminals, and wherein the three-terminal plug has a first terminal connected to the microphone input terminal, a second terminal connected to the earphone terminal, a third terminal connected to the ground terminal and a jumper line that connects the two control terminals.

9. A paging amplifier for a cellular phone, comprising:

a main body;

a handset;

a handset mounting portion provided on the main body of the paging amplifier, the handset being positionable on the handset mounting portion;

a handset hook portion provided at one end of the handset mounting portion; and a handset support member provided at another end of the handset mounting portion, at least a portion of the handset support member being positioned over the handset so as to press the handset toward the main body, wherein the handset is attached to the main body by the hand set hook portion and the handset support member.

10. The paging amplifier according to claim 9, wherein the handset is electrically connected to the main body by a connection cord at the one end where the handset hook portion is provided, wherein the handset mounting portion is provided on an upper case of the main body, and the handset hook portion is formed as a protrusion provided on the upper case.

11. The paging amplifier according to claim 9, wherein the handset hook portion has an overhang portion that holds a part of the handset.

12. A paging amplifier for a cellular phone, comprising:

a main body;

a handset;

a handset mounting portion provided on the main body of the paging amplifier, the handset being positionable on the handset mounting portion;

a handset hook portion provided at one end of the handset mounting portion; and a handset support member provided at another end of the handset mounting portion, at least a portion of the handset support member being positioned over the handset so as to press the handset toward the main body, wherein the handset is attached to the main body by the hand set hook portion and the handset support member, wherein the handset support member includes a shaft portion provided at a lower side of the handset mounting portion, a pressing portion provided at an upper side of the handset, and an arm portion that connects the shaft portion to the pressing portion, and wherein the arm portion rotates around the shaft portion so that the pressing portion moves between a pressing position and a release position, the pressing portion presses the handset toward the main body in the pressing position, and the pressing portion releases the handset in the release position.

13. The paging amplifier according to claim 12, wherein the main body includes an upper case and a lower case, wherein the shaft portion extends from one end of the arm portion, the shaft portion being positioned between the upper case and the lower case, and is rotatably supported by said main body.

14. The paging amplifier according to claim 12, wherein the shaft portion has a right angle bend and forms a stopper portion that restricts a rotation angle of the arm portion.

* * * * *